United States Patent [19]

Ammann et al.

[11] 4,412,123

[45] Oct. 25, 1983

[54] LAMINATED ELECTRIC HEAT GENERATING MEMBER FOR REFLOW SOLDERING DEVICES

[75] Inventors: Hans H. Ammann, Chester; Rocco Bonanni, Wayne; Werner Engelmaier, Mendham, all of N.J.

[73] Assignee: Bell Telephone Laboratories, Incorporated, Murray Hill, N.J.

[21] Appl. No.: 148,505

[22] Filed: May 9, 1980

[51] Int. Cl.³ .......................... B23K 3/02; H05B 3/00
[52] U.S. Cl. ............................... 219/233; 156/583.2; 174/126 CP; 219/85 D; 219/85 F; 219/228; 219/235; 219/243; 228/51; 228/54
[58] Field of Search .............. 219/85 D, 85 F, 221, 219/227, 228, 230, 233, 235, 243; 174/126 CP, 133 R, 133 B, 129 R, 129 B; 228/51-55, 180 A, 180 R; 156/583.2

[56] References Cited

U.S. PATENT DOCUMENTS

| | | | |
|---|---|---|---|
| 2,618,728 | 11/1952 | Bram | 219/243 |
| 2,620,427 | 12/1952 | Mickel | 219/243 |
| 3,095,492 | 6/1963 | Gaiehnie | 219/243 |
| 3,113,198 | 12/1963 | Shinn | 219/243 X |
| 3,401,255 | 9/1968 | Davis | 219/233 |
| 3,402,254 | 9/1968 | Parker | 174/126 CP |
| 3,786,228 | 1/1974 | Castellana et al. | 219/228 X |
| 3,991,297 | 11/1976 | Ammann | 219/235 X |
| 4,081,658 | 3/1978 | Ammann | 219/235 X |

FOREIGN PATENT DOCUMENTS

| | | | |
|---|---|---|---|
| 1379401 | 10/1964 | France | 219/243 |
| 243985 | 2/1947 | Switzerland | 219/228 |
| 411320 | 11/1966 | Switzerland | 219/243 |

*Primary Examiner*—A. Bartis
*Attorney, Agent, or Firm*—Jack S. Cubert; Kurt C. Olsen

[57] ABSTRACT

An electrically heated soldering device adapted to simultaneously heat a plurality of spaced electrical elements in a reflow soldering operation includes an elongated metal laminate of substantially U-shaped cross section having a bight portion between two side portions which may be parallel or divergent. The laminate includes a layer of aluminum between a layer of copper and a layer of stainless steel, with the layers being roll bonded together. The copper and aluminum layers are removed at the bight portion to expose the stainless steel layer and form a heat generating zone for contacting the plurality spaced electrical elements which is corrosion resistant and nonwettable by solder. The edges of the copper and aluminum layers adjacent to the exposed stainless steel bight portion are shaped to impart a selectable temperature profile, either uniform or non-uniform along the length of the bight portion. The exposed surface of the stainless steel portion can be provided with a ceramic coating to electrically insulate bight portion from the elements to be soldered. The legs of the U-shaped laminate are adapted to be connected to an electric power source through the copper and aluminum layers thereof.

6 Claims, 7 Drawing Figures

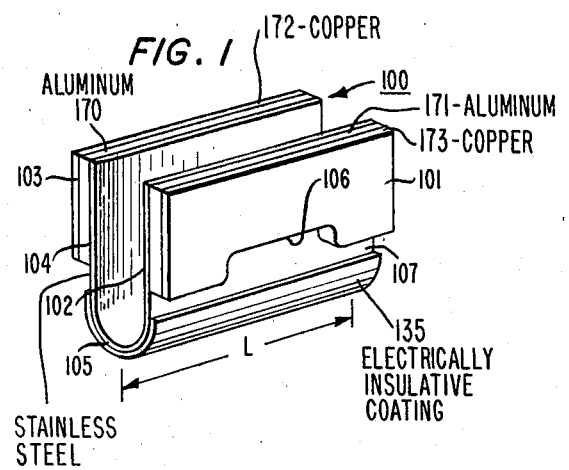
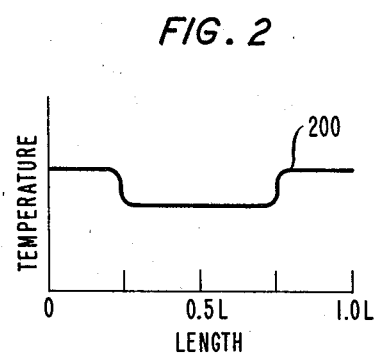
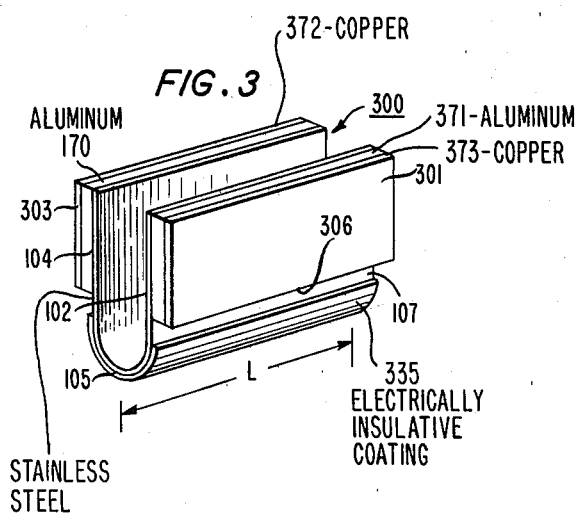
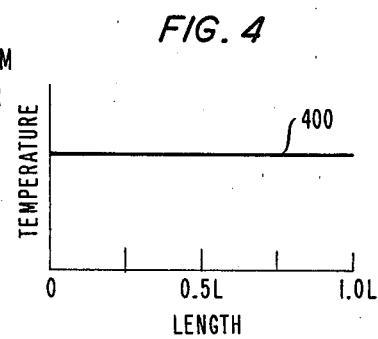
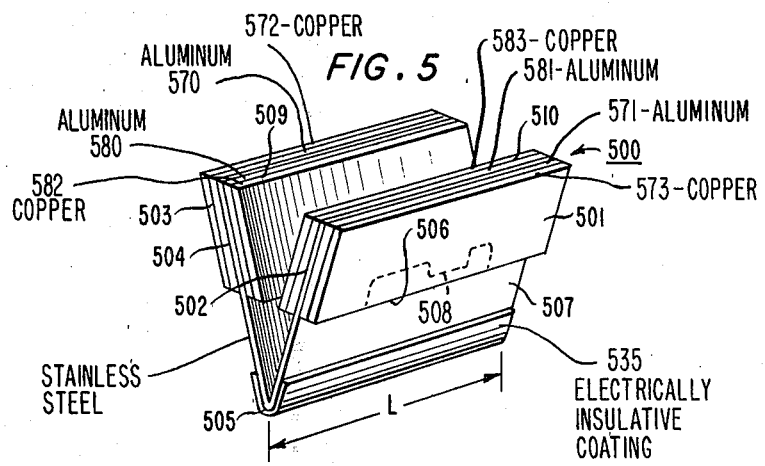

LAMINATED ELECTRIC HEAT GENERATING MEMBER FOR REFLOW SOLDERING DEVICES

BACKGROUND OF THE INVENTION

Our invention relates to selective heating apparatus and, more particularly, to heating apparatus for soldering spaced electrical elements concurrently.

Soldering has long been used for joining electrical elements in electronic apparatus. More recently, batch soldering techniques have been developed to simultaneously join a large number of elements. In one arrangement known as reflow soldering, the surface of each element is precoated with solder. Subsequently, the precoated elements are brought together and heat is applied to cause the solder to reflow. The elements are thus joined after the solder cools.

Further developments in electronic circuit techniques have required concurrent soldering of a large number of spaced electrical elements, such as connector terminations, flat, flexible cable, and flexible circuits. U.S. Pat. No. 3,991,297, issued Nov. 9, 1976, to H. H. Ammann, and U.S. Pat. No. 4,081,658, issued Mar. 28, 1978, to H. H. Ammann, both assigned to the present assignee, disclose apparatus for reflow soldering a large number of spaced electrical elements. In accordance with the aforementioned patents, a heat generating member dimensioned to concurrently contact a plurality of spaced elements is connected between spaced, parallel, relatively massive and high conductivity bars. A section of the heat generating member between the bars is placed in contact with the surface of electrical elements that have been precoated with solder. Electrical current is directed uniformly through the heat generating member to provide a uniform temperature to all the spaced elements. The uniform temperature profile of the heat generating member is not, however, adapted to soldering spaced elements having significantly different thermal loads. After reflow occurs, the electric current is discontinued. The solder operation is complete when the solder cools.

The relatively massive bars help dissipate heat from the heat generating member during cooling. The rate of heat dissipation depends on the total amount of heat to be removed and the thermal efficiency of the bar structure. The bars must be large and heavy in order to achieve an acceptable rate of heat dissipation. The heavy bars and associated current supply cables, however, are inconvenient for accurate positioning of the heat generating member and for rapid cycling in production line operations. It is therefore an object of the invention to provide precise, repeatable positioning of the heat generating member. Another object is to provide controllable temperature profile soldering of a plurality of spaced elements at a high production rate. A further object is to provide simplified and replicable manufacturing of a soldering tool having a predetermined temperature profile.

SUMMARY OF THE INVENTION

The invention is directed to an arrangement for heating a plurality of spaced elements. An elongated metal laminate of substantially U-shaped cross section has a bight portion between two side portions. The laminate includes a layer of aluminum between a layer of copper and a layer of stainless steel. The layers are roll bonded together. The copper and aluminum layers are removed at the bight portion to expose the stainless steel layer. The edges of the copper and aluminum layers adjacent to the bight portion are shaped to impart a selectable temperature profile along the bight portion. The copper and aluminum layers are connected to a source of electrical current.

According to one aspect of the invention, the edges of the copper and aluminum layers are shaped to impart a nonuniform predetermined temperature profile along the length of the bight portion.

According to another aspect of the invention, the the edges of the copper and aluminum layers are shaped to impart a substantially uniform predetermined temperature profile along the length of the bight portion.

According to yet another aspect of the invention, the laminate comprises an L-shaped apparatus, whereby a portion of the apparatus is resiliently responsive to mechanical force.

BRIEF DESCRIPTION OF THE DRAWINGS

FIG. 1 is a perspective drawing of one embodiment illustrative of the invention;

FIG. 2 is a graph showing the temperature profile of the third section of the embodiment of FIG. 1;

FIG. 3 is a perspective drawing of another embodiment illustrative of the invention;

FIG. 4 is a graph showing the temperature profile of the third section of the embodiment of FIG. 3;

FIG. 5 is a perspective drawing of another embodiment illustrative of the invention;

DETAILED DESCRIPTION

Figure 6:
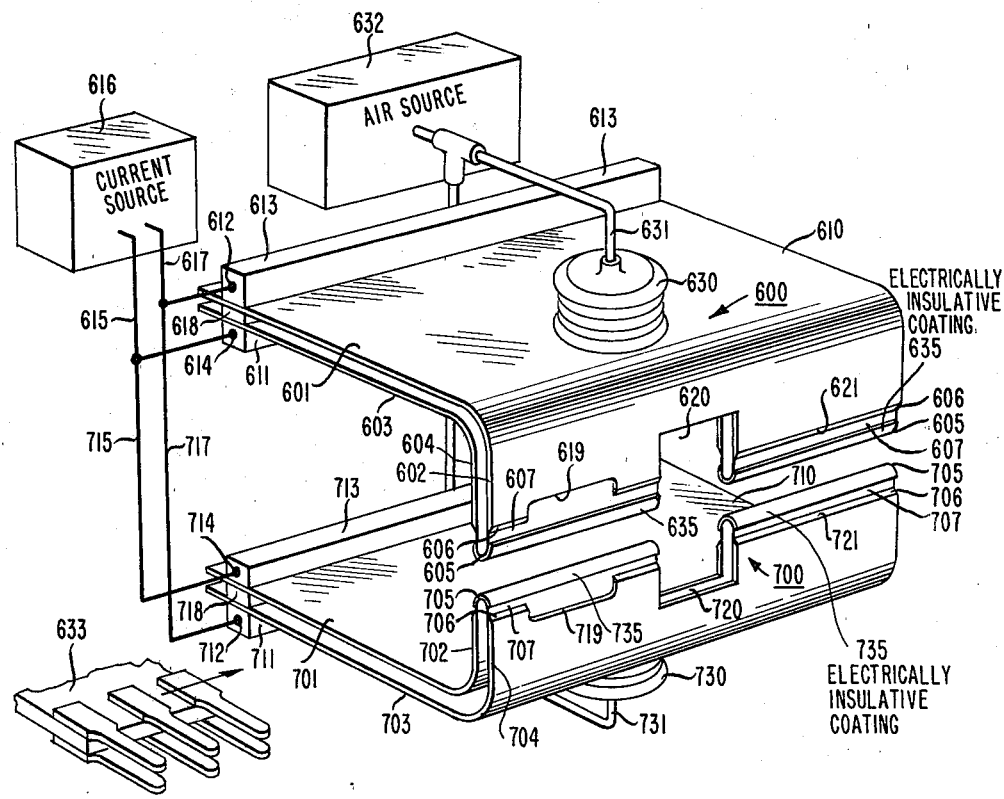
FIG. 6 is a perspective drawing of mass production soldering apparatus configured to concurrently solder both sides of a workpiece having a plurality of electrical terminations.

Referring to FIG. 1, a soldering tool head 100 comprises a low resistance strip 101 in spaced relation with a low resistance strip 103. Each low resistance strip is an elongated, relatively thin, strip having high thermal and electrical conductivity. An elongated heat generating member 107 is disposed between strips 101 and 103. A first section 102 of heat generating member 107 is connected all along its length to strip 101, and a second section 104 of heat generating member 107 is similarly connected all along its length to strip 103.

Heat generating member 107 may be formed from a stainless steel, such as a ferritic, martensitic, or austenitic grade. Other relatively low electrical conductivity metals may also be used. Advantageously, austenitic stainless steel is corrosion resistant, nomagnetic, and nonwettable by solder. Strips 101 and 103 may each be formed from copper, a laminate of copper and aluminum, or other relatively high thermal and electrical conductivity metals. Advantageously, high pressure rolling may be used to bond first section 102 together with strip 101, and to bond second section 104 together with strip 103. Alternate techniques well known in the art may also be used to provide a low thermal and electrical resistance bond between the sections and the strips. The thickness of heat generating member 107 is limited to provide a relatively high resistance from strip 101 to strip 103. The cross-section of heat generating member 107, however, must be sufficient to provide a rigid structure.

A third section 105 of heat generating member 107 extends below strips 101 and 103 to contact the elements to be soldered. Means, well known in the art, are provided to apply electrical current from an electrical current source (not shown) between strips 101 and 103, thereby causing heating in third section 105. An edge 106 of strip 101 and an edge (not shown) of strip 103 adjacent to third section 105 are shaped to impart a predetermined temperature profile which is nonuniform along the length of third section 105. For example, edge 106 is lower at each end of strip 101 than it is toward the center of the strip. The temperature in third section 105 is thus higher at each end of the section than it is toward the center of the section. Other nonuniform predetermined temperature profiles are possible by appropriately shaping the edges of the strips. Advantageously, the ability to establish a particular nonuniform temperature profile facilitates the concurrent soldering of spaced elements presenting significantly nonuniform thermal loads. The length of third section 105 is determined by the number and size of spaced electrical elements to be concurrently soldered.

FIG. 2 is a graph wherein the abscissa axis represents length along third section 105. The ordinate axis represents the relative temperature in the lowest part of third section 105. Curve 200 is thus the longitudinal temperature profile of third section 105.

Referring to FIG. 3, a soldering tool head 300 comprises a low resistance strip 301 in spaced relation with a low resistance strip 303. Each low resistance strip is an elongated, relatively thin, strip having high thermal and electrical conductivity. Heat generating member 107 is disposed between strips 301 and 303. First section 102 of heat generating member 107 is connected all along its length to strip 301, and second section 104 of heat generating member 107 is similarly connected all along its length to strip 303.

Strips 301 and 303 may each be formed from copper, a laminate of copper and aluminum, or other relatively high thermal and electrical conductivity metals. Advantageously, high pressure rolling may be used to bond first section 102 together with strip 301, and to bond second section 104 together with strip 303. Alternate techniques well known in the art may also be used to provide a low thermal and electrical resistance bond between the sections and the strips.

Third section 105 of heat generating member 107 extends below strips 301 and 303 to contact the elements to be soldered. Means, well known in the art, are provided to apply electrical current from an electrical current source (not shown) between strips 301 and 303, thereby causing heating in third section 105. An edge 306 of strip 301 and an edge (not shown) of strip 303 adjacent to third section 105 are shaped to impart a predetermined temperature profile which is substantially uniform along the length of third section 105. For example, edge 306 is substantially linear along the length of strip 301. The temperature in third section 105 is thus substantially constant. Even more accurate uniform temperature profiles are possible by precisely shaping the edges of the strips to account for small irregularities in the material properties of heat generating member 107. Advantageously, the ability to accurately establish a uniform temperature profile facilitates the concurrent soldering of spaced elements presenting uniform thermal loads which are also temperature sensitive.

FIG. 4 is a graph wherein the abscissa axis represents length along third section 105. The ordinate axis represents the relative temperature in the lowest part of third section 105. Curve 400 is thus the longitudinal temperature profile of third section 105.

Referring to FIG. 5, a soldering tool head 500 comprises a pair of low resistance strips 501 and 510 in spaced relation with each other and with a pair of low resistance strips 503 and 509. Each low resistance strip is an elongated, relatively thin, strip having high thermal and electrical conductivity. An elongated heat generating member 507 is disposed between strips 501 and 503. The exterior of a first section 502 of heat generating member 507 is connected all along its length to strip 501, and the interior of first section 502 is similarly connected all along its length to strip 510. The exterior of a second section 504 of heat generating member 507 is connected all along its length to strip 503, and the interior of second section 504 is similarly connected all along its length to strip 509.

Heat generating member 507 may be formed from a stainless steel, such as a ferritic, martensitic, or austenitic grade. Other relatively low electrical conductivity metals may also be used. Advantageously, austenitic stainless steel is corrosion resistant, nonmagnetic, and nonwettable by solder. Strips 501, 510, 503, and 509 may each be formed from copper, a laminate of copper and aluminum, or other relatively high thermal and electrical conductivity metals. Advantageously, high pressure rolling may be used to bond first section 502 together with strips 501 and 510, and to bond second section 504 together with strips 503 and 509. Alternate techniques well known in the art may also be used to provide a low thermal and electrical resistance bond between the sections and the strips. The thickness of heat generating member 507 is limited to provide a relatively high resistance from strips 501 and 510 to strips 503 and 509. The cross-section of heat generating member 507, however, must be sufficient to provide a rigid structure.

A third section 505 of heat generating member 507 extends below strips 501, 510, 503, and 509 to contact the elements to be soldered. Means, well known in the art, are provided to apply electrical current from an electrical current source (not shown) between first pair of strips 501 and 510 and second pair of strips 503 and 509, thereby causing heating in third section 505. An edge 506 of strip 501 and edges (not shown) of strips 510, 503, and 509 adjacent to third section 505 are shaped to impart a predetermined temperature profile which is substantially uniform along the length of third section 505. The uniform temperature profile facilitates concurrent soldering of spaced elements which present uniform thermal loads. Strips 501, 510, 503, and 509 may be shaped to impart other predetermined temperature profiles as determined by the particular thermal loads presented by the spaced elements to be concurrently soldered. For example, as shown by a dashed line, the edge 508 of strip 501 adjacent to third section 505 is shaped to impart a particular nonuniform predetermined temperature profile. The length of third section 505 is determined by the number and size of spaced electrical elements to be concurrently soldered.

Referring to FIG. 6, a first soldering tool 600 is shown in spaced relation with a second soldering tool 700. First soldering tool 600 is L-shaped and has a portion 610 which is resiliently responsive to the application of mechanical force. Second soldering tool 700 is similarly L-shaped and has a portion 710 which is also resiliently responsive to the application of mechanical force.

First soldering tool 600 comprises a low resistance strip 601 in spaced relation with a low resistance strip 603. Each low resistance strip is an elongated, relatively thin, strip having high thermal and electrical conductivity. An elongated heat generating member 607 is disposed between strips 601 and 603. A first section 602 of heat generating member 607 is connected all along its length to strip 601, and a second section 604 of heat generating member 607 is similarly connected all along its length to strip 603.

Heat generating member 607 may be formed from a stainless steel, such as a ferritic, martensitic, or austenitic grade. Other relatively low electrical conductivity metals may also be used. Advantageously, austenitic stainless steel is corrosion resistant, nonmagnetic, and nonwettable by solder. Strips 601 and 603 may each be formed from copper, a laminate of copper and aluminum, or other relatively high thermal and electrical conductivity metals. Advantageously, high pressure rolling may be used to bond first section 602 together with strip 601, and to bond second section 604 together with strip 603. Alternate techniques well known in the art may also be used to provide a low thermal and electrical resistance bond between the sections and the strips. The thickness of heat generating member 607 is limited to provide a relatively high resistance from strip 601 to strip 603. The cross-section of heat generating member 607, however, must be sufficient to provide a rigid structure.

A third section 605 of heat generating member 607 extends below strips 601 and 603 to contact the elements to be soldered, except in a notched region 620. An edge 606 of strip 601 and an edge (not shown) of strip 603 adjacent to third section 605 are shaped to impart a predetermined temperature profile along the length of third section 605. As shown, a linear region 621 of edge 606 establishes a substantially uniform temperature profile along the corresponding region of third section 605. A nonuniform region 619 of edge 606 establishes a nonuniform temperature profile along the corresponding region of third section 605. The edge 606 of strip 601 and the edge (not shown) of strip 603 may be shaped to impart other predetermined temperature profiles as determined by the particular thermal loads presented by the spaced elements to be concurrently soldered. Similarly, notched region 620 may be relocated or omitted as required to accommodate particular configurations of spaced elements.

An energy source 616 supplies electrical current to bars 611 and 613 through conductors 615 and 617. Conductor 615 is connected to bar 611 at a point 614, and conductor 617 is similarly connected to bar 613 at a point 612. Electrical current from source 616 flows through conductor 615, bar 611, strip 603, heat generating member 607 transverse to its elongated dimension, strip 601, bar 613, and conductor 617. An insulative bar 618 prevents electrical current from bypassing third section 605 of heat generating member 607. The relatively high resistance of heat generating member 607 causes heating in third section 605 responsive to the application of electrical energy to bars 611 and 613. Strips 603 and 601 assure a more uniform distribution of current and reduced energy consumption in heat generating member 607 over the prior art. Bars 611, 613, and 618 comprise a stationary structure at one end of portion 610 of first soldering tool 600 which provides mechanical support and assists heat dissipation.

Since second soldering tool 700 is substantially identical to first soldering tool 600, the structural description of the second soldering tool will not be repeated. It is to be understood, however, that the second soldering tool may have a different predetermined temperature profile than the first soldering tool.

In operation, an air bladder 630 expands responsive to compressed air supplied by a pipe 631 from an air source 632. As air bladder 630 expands, first soldering tool 600 deflects downward to contact the top of a workpiece 633. Compressed air is similarly supplied through a pipe 731 to an air bladder 730 which causes second soldering tool 700 to deflect upward to contact the bottom of the workpiece 633. Both sides of workpiece 633 are thus concurrently contacted for soldering. After the solder reflows, the compressed air is released from air bladders 630 and 730 and portions 610 and 710 cause soldering tools 600 and 700 to resiliently retract from workpiece 633.

Figure 7:
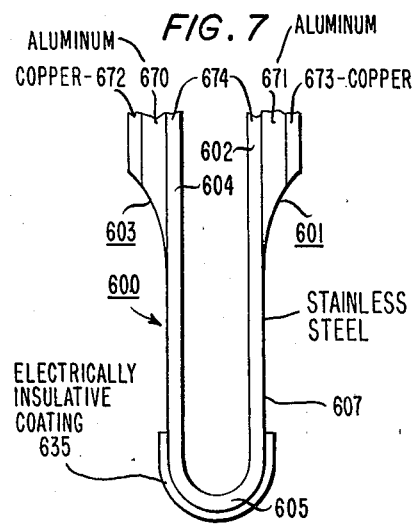
FIG. 7 is a partial side view of the embodiment of FIG. 6.

Referring to FIG. 7, first soldering tool 600 is advantageously made with a commercially available rolled metal laminate of copper 672 and 673, aluminum 670 and 671 and stainless steel 674. The aluminum is used because copper and stainless steel alone do not form a secure rolled bond. First soldering tool 600 is made by removing (for example, by milling) copper and aluminum layers from a flat sheet of laminate (not shown) to expose an area of stainless steel. The remaining copper 672 and 673 and aluminum 670 and 671 comprise low resistance strips 601 and 603 which cover first and second sections 602 and 604, respectively, of first soldering tool 600. The exposed area of stainless steel is bent to form third section 605. Third section 605 may be arcuate shaped, as shown, or it may be V-shaped.

While particular embodiments of the invention have been shown and described, it is to be understood that numerous changes may be made in form and details without departing from the spirit and scope of the invention. For example, the third section may be shaped to mechanically hold elements during soldering. A dimpled third section may be used to secure convex elements. A comb-like or tooth-like third section may be used to solder very thin or closely spaced elements, as prevalent in integrated circuits. The strips and heat generating member may be slotted to provide a flexible soldering tool. Alternatively, a tool may be bent plastically for soldering a particular pattern, such as the arrangement of elements around a dual in-line package. A coating 135, 335, 535, 635 and 735, such as a ceramic, may be applied to the exterior of the third section to electrically insulate the section from the elements to be soldered. Also, a portion of the soldering tool head, for example, the third section, may be made detachable so that replacement of the contacting region is more convenient.

We claim:

1. Apparatus for heating a plurality of spaced elements comprising:
   an elongated metal laminate of substantially U-shaped cross section having a bight portion between two side portions, said laminate including a layer of aluminum between a layer of copper and a layer of stainless steel, the layers being roll bonded together, the copper and aluminum layers being removed at the bight portion to expose the stainless steel layer for contacting the plurality of spaced elements, the edges of said copper and aluminum layers adjacent to said bight portion being shaped to impart a selectable temperature profile along the length of said bight portion; and an electrical current source and means for applying electrical current from the source to the copper and aluminum layers.

2. Apparatus according to claim 1 wherein the edges of said copper and aluminum layers adjacent to said bight portion are shaped to impart a nonuniform predetermined temperature profile along the length of said bight portion.

3. Apparatus according to claim 1 wherein the edges of said copper and aluminum layers adjacent to said bight portion are shaped to impart a substantially uniform temperature profile along the length of said bight portion.

4. Apparatus according to claim 1 wherein said side portions are substantially parallel.

5. Apparatus according to claim 1 wherein the exposed contacting area of said stainless steel layer has an electrically insulative coating.

6. Apparatus according to claim 1 wherein said side portions are divergent.

* * * * *